United States Patent [19]

Love et al.

[11] Patent Number: 4,457,877
[45] Date of Patent: Jul. 3, 1984

[54] FLUID GASIFICATION APPARATUS

[76] Inventors: James P. Love, 2 Chestnut Close, Market Bosworth, Nuneaton, Warwicks, CV13 OLR; Syed O. Z. M. Rafique, Knowle House, Knowle Hill, Kenilworth, Warwicks CV8202, both of England

[21] Appl. No.: 373,493
[22] PCT Filed: Aug. 28, 1981
[86] PCT No.: PCT/GB81/00173
  § 371 Date: Apr. 16, 1982
  § 102(e) Date: Apr. 16, 1982
[87] PCT Pub. No.: WO82/00778
  PCT Pub. Date: Mar. 18, 1982

[30] Foreign Application Priority Data

Sep. 1, 1980 [GB] United Kingdom ............... 80 28130
Oct. 10, 1980 [GB] United Kingdom ............... 80 32809
Mar. 30, 1981 [GB] United Kingdom ............... 81 09914
Jul. 30, 1981 [GB] United Kingdom ............... 81 23433

[51] Int. Cl.³ .............................................. B01F 3/04
[52] U.S. Cl. .............................. 261/64 B; 261/121 R; 261/DIG. 7; 141/17; 141/329; 141/70; 141/302
[58] Field of Search ........... 261/DIG. 7, 121 R, 64 B; 141/17, 19, 329, 330, 70, 302, 301

[56] References Cited

U.S. PATENT DOCUMENTS

| | | | |
|---|---|---|---|
| 1,592,305 | 7/1926 | Lewis | 261/DIG. 7 |
| 1,905,986 | 4/1933 | Jacobs . | |
| 2,073,273 | 3/1937 | Wetstein . | |
| 2,132,011 | 10/1938 | Bennett et al. | 261/DIG. 7 |
| 2,229,441 | 1/1941 | Carlson | 261/DIG. 7 |
| 2,336,708 | 12/1943 | Ward | 141/17 |
| 2,339,640 | 1/1944 | Holinger . | |
| 2,545,233 | 3/1951 | Kaufman | 141/302 |
| 2,794,452 | 6/1957 | Quam | 141/17 |
| 2,805,846 | 9/1957 | Dewan | 261/DIG. 7 |
| 3,005,475 | 10/1961 | Beall, Jr. | 141/301 |
| 3,473,704 | 10/1969 | O'Donnell | 141/302 |
| 4,011,288 | 3/1977 | Assenheimer et al. | 261/121 R |
| 4,189,068 | 2/1980 | Apellaniz . | |
| 4,298,551 | 11/1981 | Adolfsson et al. | 261/DIG. 7 |

FOREIGN PATENT DOCUMENTS

| | | |
|---|---|---|
| 268927 | 10/1912 | Fed. Rep. of Germany . |
| 1532530 | 1/1970 | Fed. Rep. of Germany ...... 141/301 |
| 779459 | 4/1935 | France . |
| 1257843 | 2/1961 | France . |
| 1284324 | 1/1962 | France . |
| 1331828 | 5/1963 | France . |
| 1379049 | 10/1964 | France . |
| 365570 | 7/1930 | United Kingdom . |
| 399352 | 10/1933 | United Kingdom . |
| 472600 | 9/1937 | United Kingdom . |
| 485258 | 5/1938 | United Kingdom . |
| 509105 | 7/1939 | United Kingdom . |
| 538937 | 8/1941 | United Kingdom . |
| 571114 | 8/1945 | United Kingdom . |
| 783230 | 9/1957 | United Kingdom . |
| 823297 | 11/1959 | United Kingdom . |
| 838552 | 7/1960 | United Kingdom . |
| 959079 | 5/1964 | United Kingdom . |
| 119514 | 7/1968 | United Kingdom . |
| 1281613 | 7/1972 | United Kingdom . |
| 1289551 | 9/1972 | United Kingdom . |
| 1453363 | 10/1976 | United Kingdom . |
| 2026882 | 2/1980 | United Kingdom . |
| 2049454 | 12/1980 | United Kingdom . |

*Primary Examiner*—Tim R. Miles
*Attorney, Agent, or Firm*—Cushman, Darby & Cushman

[57] ABSTRACT

Apparatus for gasifying a liquid with a fluid supplied in liquid form has a discharge conduit for the fluid in which there are one or more restricted cross-section flow paths in a material providing a heat source for converting the fluid to a dry gas. Sealing means are urged resiliently against the open lip of a liquid-filled container into which the discharge conduit projects. Control means for the discharge rate of the dry gas flow from the conduit limit the pressure rise in the container. The sealing means comprises portions of greater flexural compliance permitting excess pressure to be vented from the container. The apparatus may comprise two telescopically movable parts, one holding the liquid container and the other holding a sealed bulb of the gasifying fluid. Said container and bulb are mounted in the parts such that said telescoping movement adjusts itself to accommodate different sizes of container and capsule.

23 Claims, 32 Drawing Figures

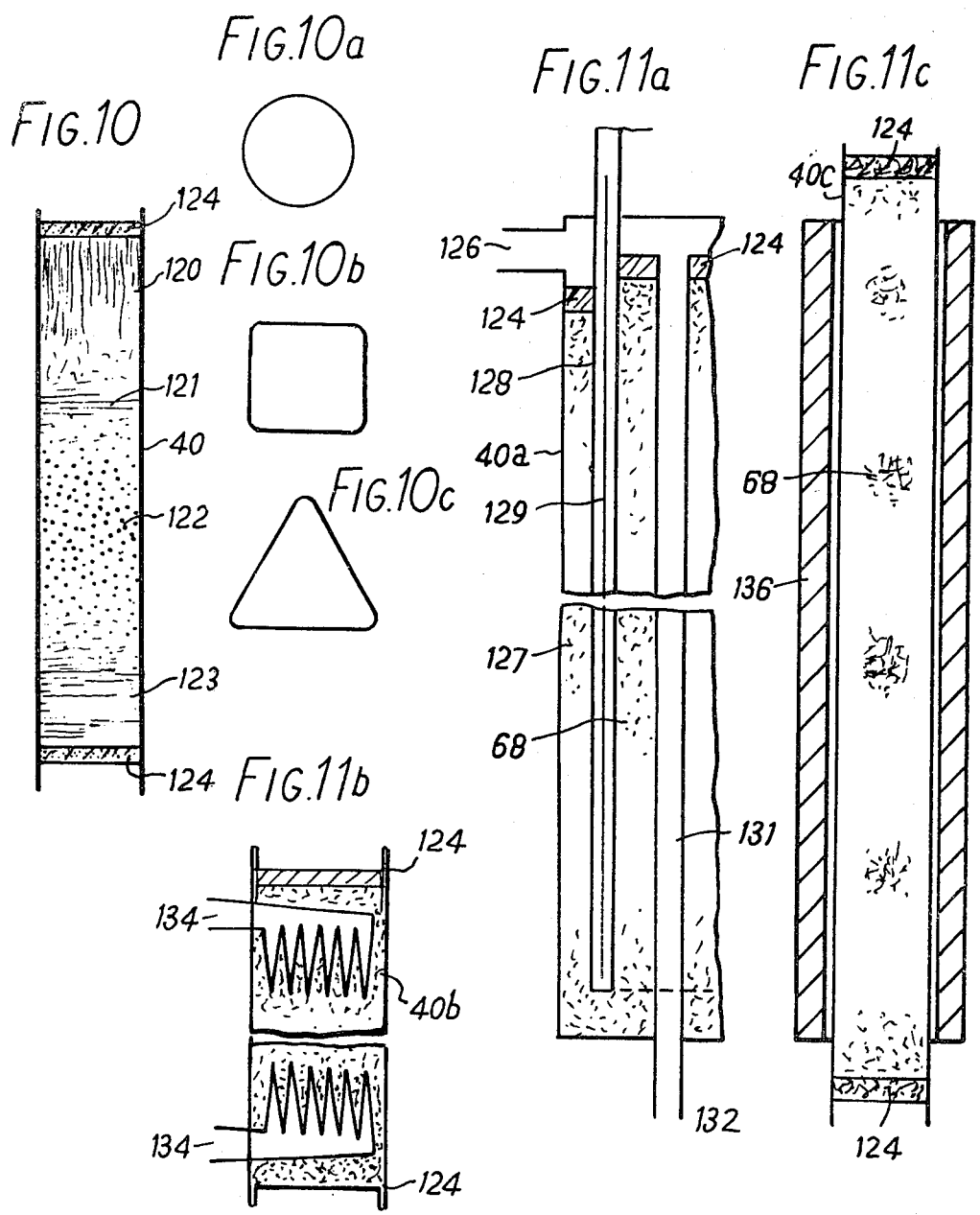

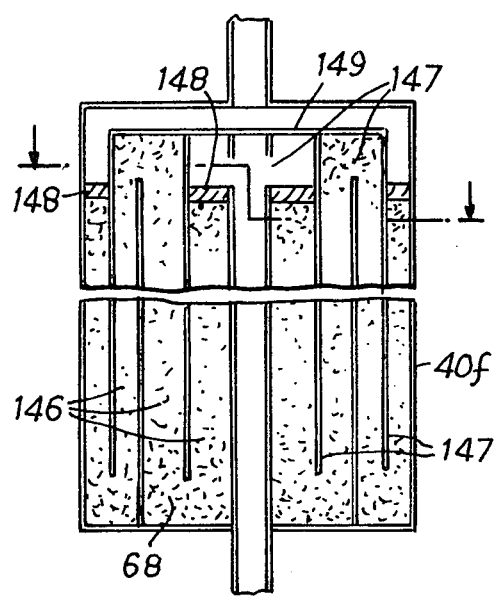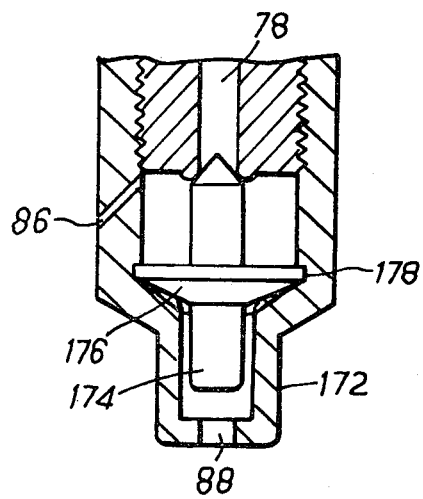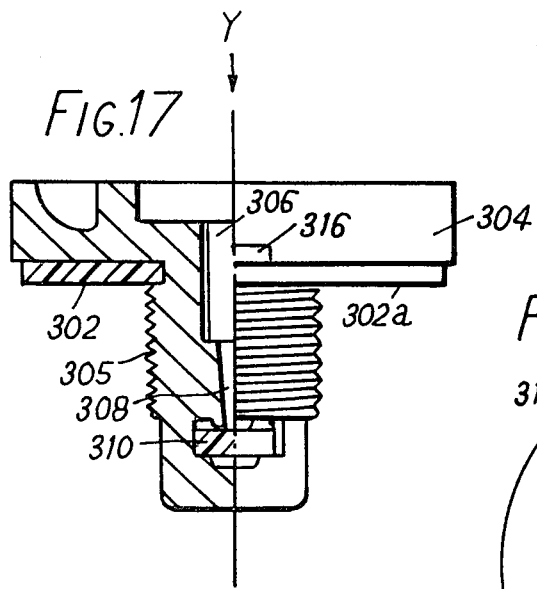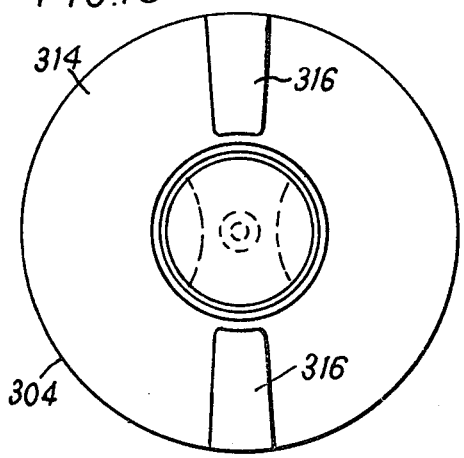

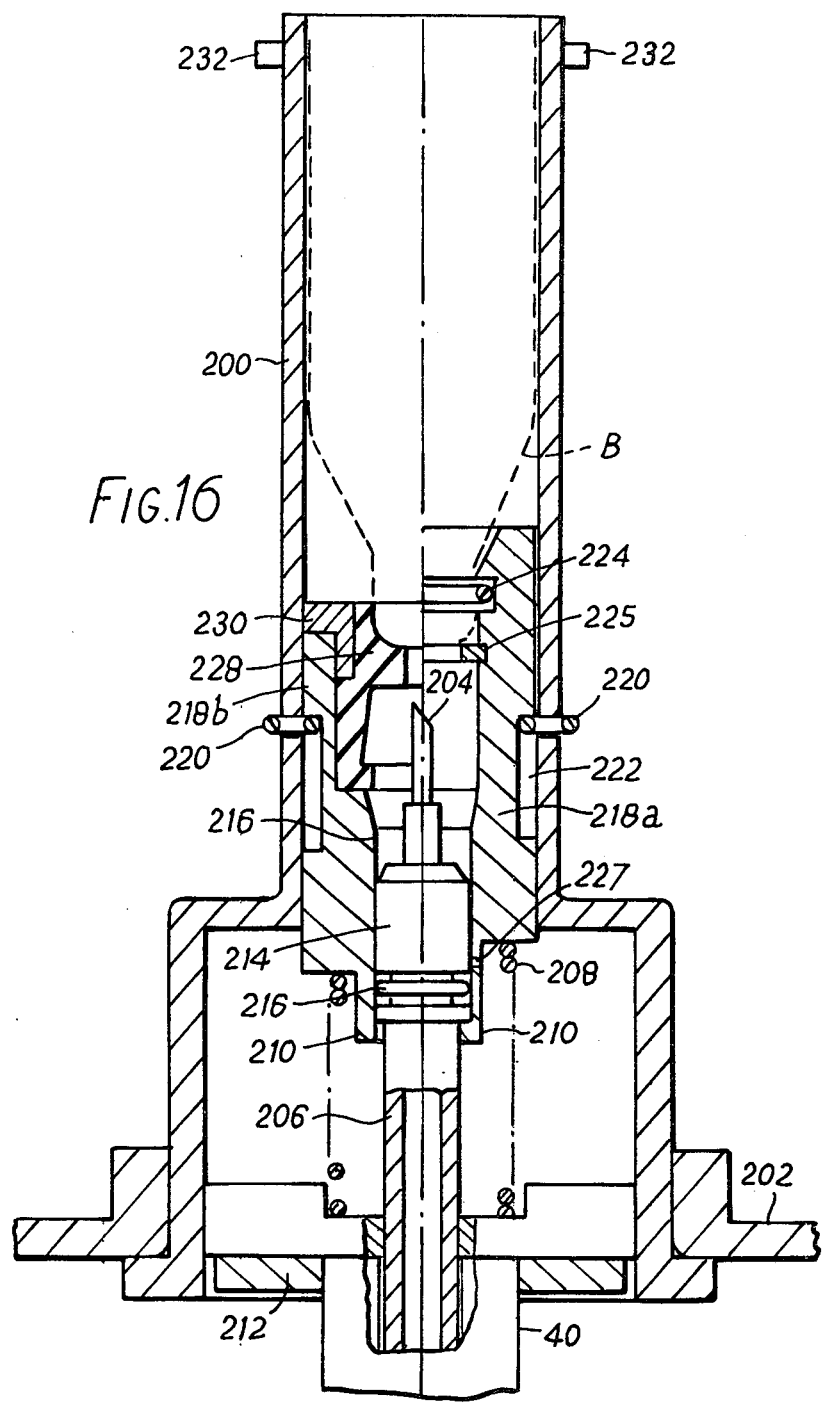

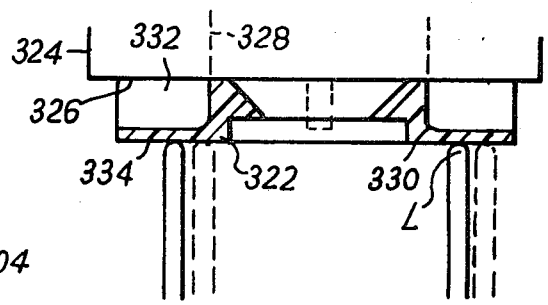
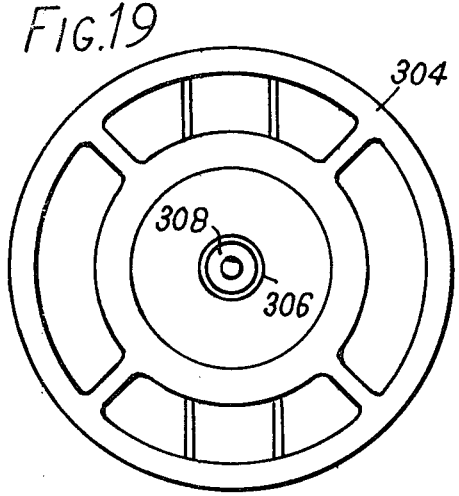
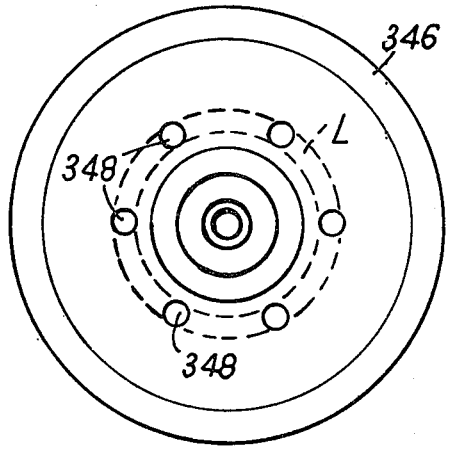
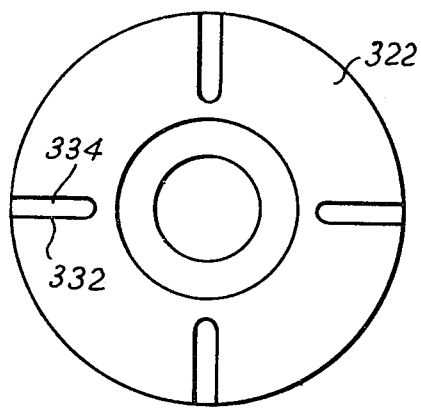
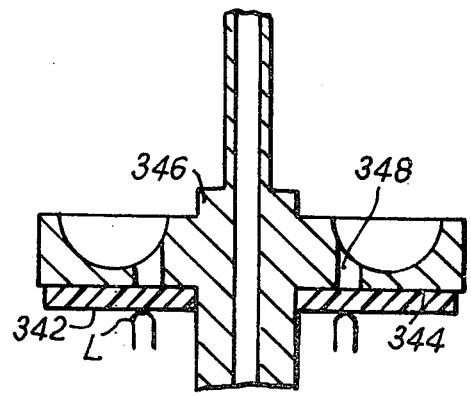

FLUID GASIFICATION APPARATUS

FIELD OF THE INVENTION

This invention relates to apparatus for transforming a fluid in the form of a liquid or a wet vapour (that is to say a fluid which is wholly or partially in its liquid phase) into a dry gas (that is to say a fluid which is wholly in its gaseous phase). More particularly it is concerned with apparatus for charging liquids (the term "liquids" being here intended to include also emulsions and suspensions) with pressurised gas so transformed. In one of its aspects the invention is concerned with the use of encapsulated liquid gas products that are to be discharged into a liquid container to gasify the liquid therein.

BACKGROUND OF THE INVENTION

There are many processes that require the use of a fluid that is a gas at normal temperature and pressure but, for ease of handling and storage prior to use, is supplied in liquified form to be gasified when required. One example is shown in UK Pat. No. 1,289,551, which describes a method of storing natural gas as a liquid by pressurising and cooling it, the user pipeline being supplied with the gasified product obtained by expansion of the stored liquid. The supply is continuously maintained and is stabilised in accordance with the user demand by allowing the liquid to be vaporised in a heat exchanger. Specifically, the heat exchanger employs a medium that undergoes a phase change at a temperature between the boiling points of the liquified gas at the minimum and maximum supply rates of the gas through the pipeline.

In another known apparatus described in UK Pat. No. 1,281,613 liquid nitrogen is used to provide a heated pressurised gas for fluid power purposes by being vaporised in a heat exchanger containing heated alumina pellets as the heat exchange medium through which the nitrogen percolates.

The fluids in these two examples cannot be liquified at normal (i.e. ambient) temperatures, and must be considerably cooled also. There are many fluids that can be liquified by pressure without substantially lowering their temperature below normal, and when the liquid is subsequently vaporised it is possible that the absorption of energy that occurs will result in cooling of the fluid sufficient to transform some of the fluid directly into the solid phase. The unwanted change to the solid phase is undesirable as it can considerably delay the rate at which a quantity of the fluid is vaporised. This possibility exists for carbon dioxide, as one example of a commonly used gas, and similarly nitrous oxide.

One use of pressurised gas, and in particular carbon dioxide, is for the gasification of liquids for consumption. Apparatus is known in which an integral chamber in the apparatus is filled with liquid and a sealed bulb or capsule of liquid carbon dioxide is inserted and pierced to provide the discrete quantity of fluid required to gasify the liquid. The fluid is discharged directly from the bulb into the top of the container above the liquid surface so that it vaporises without difficulty, but the process is extremely inconvenient because the liquid must then be agitated under pressure to accelerate its gasification. In addition, this known apparatus operates as a syphon using the gas pressure to eject the gasified liquid, so that a substantial part of the gas charge remains in the container and cannot be used. The apparatus has a further major disadvantage that the chamber must be fully discharged of liquid before a further quantity of liquid can be gasified, so that its usefulness is limited.

Other apparatus is known from UK Pat. No. 1,453,363 in which the liquid in a removable container is gasified. It is therefore possible to produce larger quantities of gasified liquid over a period of time, but the apparatus is capable of operating only with one particular size and form of container to which it is adapted. Moreover this apparatus relies on the use of a large pressurised cylinder and gas is drawn off from the top of the cylinder to provide the gasifying medium that is discharged through the liquid to gasify it quickly. This apparatus is necessarily rather complex and because it requires a large capacity cylinder of the gasifying medium it is inherently more dangerous in the event of accident or misuse. Because of the large amount of pressurised gas provided by the cylinder contents the size of the container of liquid to be gasified is restricted to limit the effects of its possible rupture at the pressures that might be attained in this apparatus.

It is an important factor in all apparatus in which high gas pressures can be generated, such as for producing gasified drinks, particularly apparatus intended for general use and in situations where there may be little or no preventive maintenance, that the apparatus is safe to operate having regard to the maximum gas pressures that may be generated. It is therefore customary to provide some form of pressure relief valve, but that may not be sufficient in itself because over an extended period the valve may become defective without it necessarily becoming apparent to the user.

In UK Pat. No. 1,453,363 mentioned above, there is a cam-operated pressure relief mechanism that is operated and freed every time the lip of a bottle of liquid to be aerated is brought into sealing engagement with the pressure gas supply means, so that it is ensured that the mechanism is still operative before pressure is applied and the pressure relief valve will be released if it has previously become stuck through a long period of nonuse. This system requires a relatively complex mechanism that is expensive to produce, and moreover, although it ensures the valve mechanism operates, it cannot ensure that pressure relief gas path is not blocked. There may well be solid or gummy residues left in the fluid flow passages of the apparatus from previous use, and if these were to impede or block the escaping gas there still could be a dangerous over-pressure built up even though the valve mechanism itself operates perfectly.

SUMMARY OF THE INVENTION

One subject of the present invention is to provide an apparatus in which a flow of gas is produced from the liquid state of a substance that can be liquified by pressure and without substantially lowering its temperature below normal, said flow being produced without solidification of the fluid due to the cooling effect of its expansion from the liquid state.

Another object of the invention is to provide an apparatus for gasifying a liquid in which the rate of discharge of the gas to the liquid is controlled in dependence upon the rate at which it is dissolved into the liquid.

A further object of the invention is to provide an apparatus for gasifying a liquid in a container wherein means are provided for permitting replaceable containers of a range of different sizes to be employed.

Yet another object of the invention is to provide an apparatus for gasifying a liquid in a container by employing a presealed capsule or bulb (the term "bulb" being used in this specification to include sealed containers of any shape for encapsulating pressurised fluids) of the gasification fluid and which permits a range of different sizes of bulb to be used.

In a still further object of the invention, there is provided apparatus for gasifying a liquid in a container in which pressure relief means are provided to limit the maximum pressure in the container while the gas is being discharged into it.

According to one aspect of the invention, there is provided apparatus for gasifying a liquid in a container with a discrete amount of fluid that is supplied in a liquified state, comprising a discharge conduit for the passage of the fluid into a liquid-filled container that is sealed from the exterior while said conduit is in connection therewith, there being one or more flow paths of extended surface area within the conduit, the said path or paths being formed in a material providing a heat source for said fluid whereby the fluid is caused to flow in intimate contact with the material forming said surfaces for heat exchange with said material to absorb therefrom the heat required to convert the fluid to a dry gaseous state. (The term "extended surface area" means that the confining surfaces for the fluid flow are substantially larger in area than a direct throughflow connection of circular cross-section between the fluid supply source and the liquid-filled container. As will be described in more detail below, the term "extended surface area" includes configurations in which a conduit has within its outer envelope integral or non-integral solid elements around which the fluid flows, and narrow bore conduit configurations in convoluted form or in series and/or parallel connection.)

Because only a discrete quantity of wet fluid requires to be converted at a time, in accordance with the volume of liquid in the container, and because of the extended surface area, the material mass forming the contact surfaces can be arranged to have sufficient thermal capacity to yield the greater part of the heat required as the fluid flows through the conduit, without this material having to extract any significant amount of heat from its surroundings during the conversion of the pressurised wet fluid to its dry gaseous state. In performing its function, the material yielding the heat is of course cooled, and if its temperature falls below that of surroundings it will recuperate heat therefrom. This can begin before the whole of the discrete quantity of wet fluid has attained the dry gaseous state, but normally most of the heat of recuperation will be absorbed in the relatively short minimum intervals between the gasification of successive quantities of liquid.

A compact arrangement can be easily produced by providing a multiplicity of small cross-section paths to obtain said extended surface area. The multiplicity of paths within the conduit may be formed by the provision of dividing walls that give a series of discrete smaller cross-section passages; these passages may be connected in series or in parallel or in a mixed series/parallel configuration. In a preferred arrangement, however, a permeable mass is provided in one or more passages, so that in the or each said passage the interstices of the mass provides a very large number of very small cross-section flow paths that are randomly interconnected for the fluid percolating through the mass and that have a correspondingly large surface area exposed to the fluid. The permeable mass may conveniently be composed of particulate material and/or material in wire or strip form.

The material of said conduit interior surfaces may be arranged to recuperate heat simply by conduction from the surroundings, or means may be provided to heat it electrically, e.g. by passing a current through the material to heat it by virtue of its electrical resistance, or by electromagnetically inducing eddy or secondary currents in the material, or by incorporating an electrical heating element in the material but electrically insulated therefrom.

The discrete quantities of the wet fluid may be supplied under pressure by a metering pump, or if the vapour pressure of said fluid at ambient temperature exceeds the pressure required at the conduit outlet, after allowing for the pressure drop in percolating through the permeable mass, by use of a capsule or bulb containing the discrete quantity of the fluid in the liquid phase.

The material of the conduit interior surfaces should be selected from among those chemically inert to the fluid being processed and should have a high thermal conductivity to assist rapid heat recovery.

Depending upon the particular application of the apparatus, the configuration of the material providing these surfaces may be differently selected. If a permeable mass is used, for close control of the thickness or cross-sectional size of the elements forming the heat-transfer surfaces, material in wire or strip form may be most suitable, conveniently in bunched, matted or flocculent configuration. It may alternatively be in particulate form, perferably globular particles with a controlled range of diameters.

When employing a permeable mass, an increase in the volume of interstitial space within the envelope volume of the mass relative to the net volume of the constituent material will reduce the percolation pressure drop of the fluid but will also reduce the rate of heat transfer and would lengthen the time of recuperation of heat.

The resistance to the flow that is offered by the small cross-section paths may be arranged to be sufficient to control the rate of flow through the conduit but this is preferably supplemented by further flow restriction means.

Where any part of the whole of the permeable mass comprises metal particles or metal wire the time required for recuperation can be appreciably reduced by sintering, which induces some continuity between adjoining regions of the mass and therefore enhances the heat flow through the material which is essential for heat recuperation. If recuperation is to be achieved by taking heat from the surroundings it is preferable to sinter the permeable mass to the conduit walls to obtain intimate contact therebetween.

It may be preferred to provide non-return valves at the inlet and/or the outlet of the conduit. At the inlet the valve will have a minimal loading bias so that it opens easily to admit fluid to the conduit, but at the outlet the larger biasing force will generally be required. With both ends of the conduit closed it is possible to avoid seepage from the interstitial volume when the apparatus is not in operation between the treatment of two successive quantities of fluid, e.g. if the fluid is toxic or expensive, or if it is important to avoid contamination of the interstitial volume from the exterior.

In one particular use of the invention, liquified fluid in a presealed bulb is used to gasify liquid in a container, and by employing a heat exchange conduit as aforesaid it is possible to vaporise the fluid to a dry gas very quickly. A particularly compact arrangement can be achieved if the heat exchange conduit is arranged to project into the container through a top opening, but this is not necessary. In either case the conduit preferably has an outlet portion projecting below the liquid surface in the container with a restricted outlet to break the gas stream into small bubbles that are quickly dissolved in the liquid.

According to another aspect of the invention, there is provided apparatus for charging a liquid with a gas, in which a valve device for controlling the flow of gas under pressure comprises a closure body having peripheral sealing means engaging with the walls of a chamber in which it is displaceable, the closure body being resiliently biased against a gas inlet port having a cross-section less than the chamber cross-section at said sealing means, whereby after the valve body has been displaced from the inlet port by the gas pressure acting against the resilient bias an increased gas pressure force is applied to the body to maintain the inlet port open, said displacement of the body placing the inlet port in communication with an outlet orifice having a restricted cross-section limiting the rate of gas flow through the device.

Such gas flow control means can be employed at the outlet of a discharge conduit of the form described above, or in other forms of gasification apparatus, to control the rate of discharge of gas into the liquid in dependence upon the rate at which the gas is absorbed or dissolved into the liquid.

According to a further aspect of the invention, there is provided apparatus for discharging a fluid from a sealed bulb into a liquid in a container, comprising mounting means arranged to permit relative movement of the bulb towards the container, an opening device disposed between the bulb and the container opening the bulb during said relative movement to permit the fluid to flow in a pressurised gaseous state into the container, said opening device being provided with sealing means for engaging an entry opening of the container through which said gas is admitted, the fluid pressure in the container acting upon the sealing means against said biasing means whereby the sealing means are displaceable away from said entry opening by an increase of the container pressure over a limiting value to vent excess pressure fluid from the container.

Such apparatus may further comprise a safety blow-out valve arranged to open at a container pressure higher than said limiting value, in the event of said displacement of the sealing means being prevented.

In a preferred form of apparatus according to the invention for discharging gas under pressure into a liquid in a container through an opening in the container, the apparatus comprises a gas throughflow means circumferentially surrounded by annular sealing means for engagement with the container opening, said sealing means comprises a flexible sealing member for sealing contact with the container opening and means for supporting the sealing member against said lip, the sealing means having a flexural compliance to the internal pressure in the container that is non-uniform with respect to its circumferential extent around the gas injection means, whereby the flexible member is deformable at an angular portion or portions of said circumferential extent to release excess gas pressure in the container while being held against the opening elsewhere around said circumferential extent.

With this arrangement, high pressure gas in the container can be vented directly into the surroundings without having to pass through lengthy constricted passages that might be susceptible to blockage. Because the relief mechanism works without relying on sliding parts, but simply requires the flexure of a resilient sealing member, it is possible to provide an arrangement which will always vent the container once the pressure rises above a predetermined level. Even if there is deterioration of the material of the flexible sealing member over an extended period, this can be expected to increase the compliance of said angular portion or portions so that the apparatus will simply vent at a lower pressure and in all events a dangerous overpressure cannot build up.

The variable compliance of the sealing means can be obtained by reducing the thickness of the flexible sealing member over a portion or portions of its extent engaging with the container opening, or by providing a backing member with a contoured or stepped supporting surface for the flexible sealing member whereby a similar portion or portions of the flexible member will flex first because of the lack of support from the backing member there, or by a combination of both these features.

Preferably, the apparatus is arranged so that it is not sensitive to any eccentricity between the container opening and the annular sealing means, which might otherwise result in the pressure at which venting occurs varying according to the precise location of the container with respect to the annular sealing means. This may be accomplished by extending said portion or portions radially of the sealing means. In a preferred arrangement there are at least two radially elongate portions of greater compliance disposed substantially symmetrically about the axis of the annular sealing means.

In apparatus for discharging fluid from a sealed bulb into a liquid in a container, comprising mounting means having relatively displaceable parts for receiving the bulb and the container for permitting relative movement therebetween in order that an opening device can operate to open the bulb (e.g. for a hollow needle to pierce the bulb wall), according to another aspect of the invention there are co-operating toothed elements on said relatively displaceable parts occupying spaced peripheral portions on each part so that the two parts can be telescoped together with the toothed portions on each aligned with spaces between the toothed portions on the other, said toothed portions being thereby engageable at selective different relative axial positions of the two parts, whereby said engagement can be effected with the bulb-receiving part in a predetermined position relative to the top openings of containers of different heights.

Preferably that part of the mounting means that receives the bulb has a support for the bulb that is displaceable in the telescoping direction, and to hold the bulb for it to be pierced there is an end stop limiting the displacement of the bulb with said support when said parts of the mounting means are telescoped together, whereby sad interengagement of said parts is effected at relative axial positions of said parts dependent also upon the axial length of a bulb inserted in the apparatus.

In this manner it is possible to arrange the apparatus for use with different sizes of bulb. It will be understood that such an arrangement may be provided whether or not the mounting means are adapted to allow the use of different height container openings, although it will generally be considered desirable to have both possibilities of adaptability.

In a further aspect of the invention, in apparatus for releasing a fluid from a sealed bulb to charge a liquid in a container with a gasified fluid under pressure and comprising mounting means arranged to permit relative movement of the bulb towards the container and a rupture device disposed between the bulb and the container arranged to pierce the bulb during said relative movement to permit the fluid to flow into the container, said mounting means includes a holder for the bulb and retaining means to support the bulb in said holder against the reaction to the gas pressure during said charging, said retaining means being pivotally displaceable relative to the holder to and from a non-operative position in which it allows access to the holder for insertion of a bulb therein, stop means determining a limiting operative position for the retaining means after the insertion of the bulb, the pivot attachment of the retaining means being offset from the line of action of the gas pressure whereby said pressure acts to urge the inserted bulb against the retaining means to hold it in said limiting operative position.

Further details of the invention will be described by way of example with reference to the accompanying drawings.

BRIEF DESCRIPTION OF THE DRAWINGS

FIG. 10 is a composite illustration of a number of different forms of heat transfer material in a heat exchange conduit for the vaporisation of a liquified gas, FIGS. 10a, 10b and 10c illustrate some alternative cross-sectional forms of the heat exchange conduit, FIGS. 11a, 11b and 11c are partial longitudinal sections showing heat exchange conduits provided with electrical heating means, FIGS. 13a and 13b are longitudinal and cross-sections or another form of conduit, FIG. 15 is a schematic part section of a modified form of the outlet orifice valve of FIG. 3, FIG. 16 is a composite view of two axial half sections illustrating portions of two further alternative forms of shuttle and bulb holder for the apparatus of FIG. 1

FIG. 17 is a side view in half section, illustrating container sealing means for apparatus according to the invention, FIGS. 18 and 19 are opposite end views, seen in the directions X and Y respectively, of the sealing member of the sealing means in FIG. 17, FIGS. 20 and 21 are end and axial sectional views of a flexible sealing member for another sealing means for apparatus according to the invention, and FIGS. 22 and 23 are axial section and end views of a further form of sealing means for apparatus according to the invention.

DESCRIPTION OF THE PREFERRED EMBODIMENTS

Figure 1:
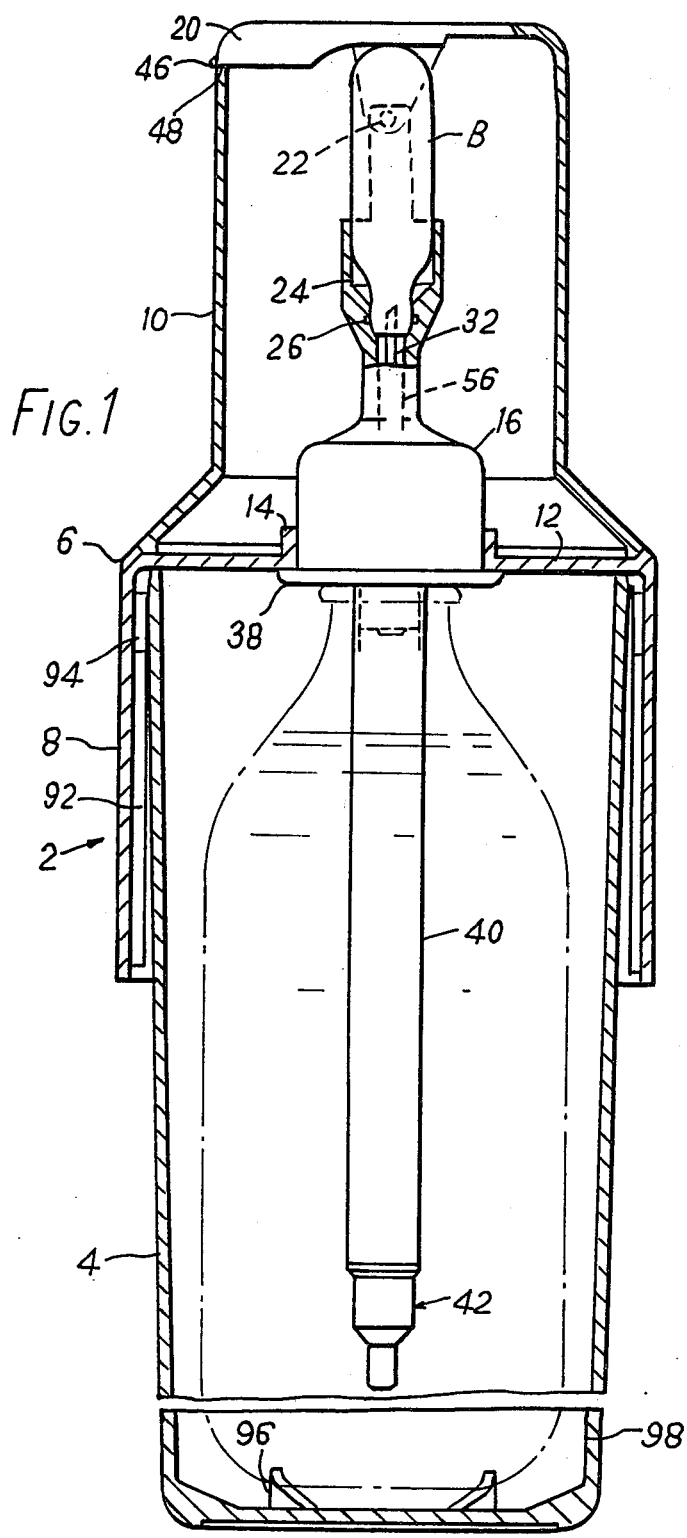
FIG. 1 is a vertical axial section of one form of apparatus according to the invention.

Referring in particular to FIGS. 1 to 4 of the drawings, the apparatus comprises an outer casing 2 which provides mounting means for a bottle or other container (not shown) containing a liquid to be carbonated and a carbon dioxide bulb B that itself may be of a conventional form used to produce carbonated drinks domestically, e.g. holding a change of 8 gm liquid carbon dioxide. The bottle is mounted in a lower part 4 of the casing and the bulb B in an upper part 6 that is detachably secured to the lower part by a toothed or threaded arrangement to be described in more detail below.

The container upper part 6 comprises a cylindrical lower skirt 8 and a top cap 10 abutting the skirt at a peripheral junction and secured thereto by snap ribs (not shown). The lower skirt has a top wall 12 with a flanged central aperture 14 in which a bulb holder 16 for the bulb B is an interference fit, there also being engagement means (not shown) between the top wall and the holder to prevent relative rotation. The top cap 10 has an opening in its top wall that is closed by a pivoting lid 20 described in more detail below, attached to the bulb holder 16 through an offset transverse pivot mounting 22. By swinging the lid clockwise from the position shown in FIG. 1, there is access to cup 24 of the bulb holder for the bulb to be inserted, and the neck of the bulb being sealingly engaged by an O-ring 26 at the lower end of the cup.

The bulb holder 16 includes a downwardly open cylindrical portion 28 in which there is a sliding shuttle 30 that comprises a hollow needle 32 projecting upwardly from it towards the bulb. The needle is biased away from the bulb by a compression spring 34 acting between the shuttle and the top wall 36 of the holder cylindrical portion. A stop ring 38 at the bottom of the cylindrical portion retains the shuttle within the holder.

The shuttle has a gas expansion tube 40 projecting downwards from it and terminating at an outlet orifice valve 42 near the bottom of the housing lower part to provide a heat transfer conduit for bulb fluid to flow into the liquid. In use, the tube extends into the bottle of liquid, with the neck of the bottle sealed against a sealing disc 44 on the underside of the shuttle, the upper and lower parts of the casing 2 then being so positioned that the bottle forces the shuttle upwards, and therefore the needle also, to pierce the bulb. The liquid carbon in the bulb vaporises as it passes through the expansion tube where the cooling effect of the expansion is partly counteracted by heat transfer from the material of the tube, so that the formation of solid carbon dioxide is prevented and the fluid is introduced into the bottle as a dry gas to carbonate the liquid there.

The upwards force of the needle, and the subsequent reaction to the gas pressure acting in the same direction tend to push the bulb B upwards out of the holder cup 24, but this is resisted by the pivotable lid 20 when, after a small movement to take up any clearance, the top of the bulb bears on the closed lid. Because of its offset pivot mounting 22, the lid will be urged anticlockwise (as seen in FIG. 1) but is prevented from moving any further in this direction when in the closed position by an end stop formed by a bottom edge 46 of the lid and an opposed top edge 48 on the top cap engaging therewith.

Figure 2:
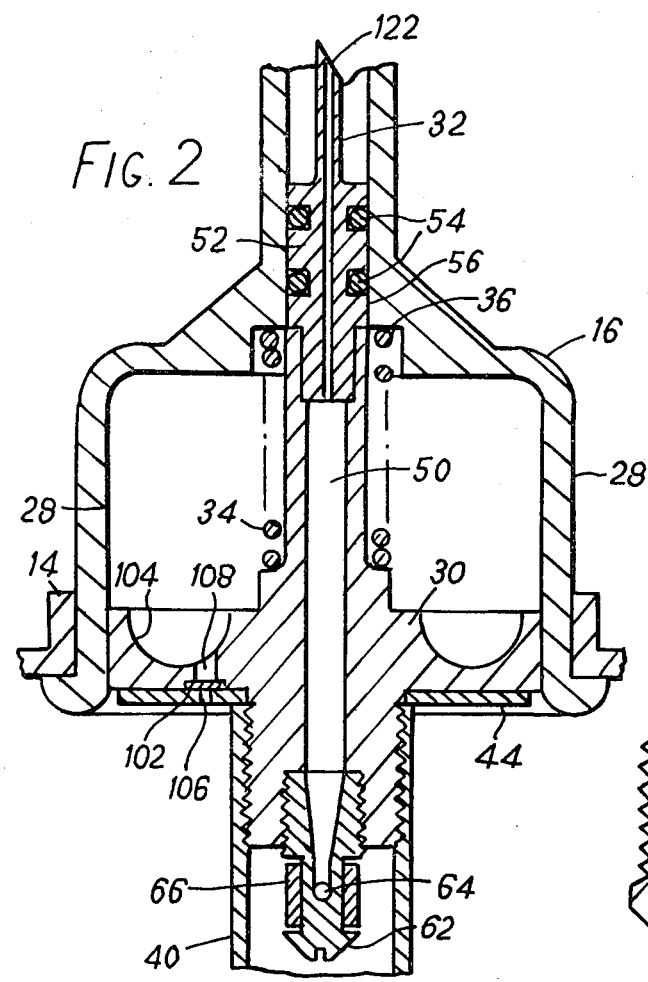
FIGS. 2 and 3 are similar section views, to a larger scale, of the shuttle and of the outlet orifice valve respectively of the apparatus in FIG. 1.

As can be seen in more detail in FIG. 2, the hollow needle 32 communicates with a central passage 50 in the shuttle. The needle is fixed to the main body of the shuttle through its stem 52 provided with two O-rings 54 in series that act both to seal the bulb holder bore 56 in which they slide and also to centralise the needle relative to that bore. The central passage 50 in the shuttle connects the interior bore of the needle to a shuttle plug 62 wherein a transverse exit passage 64 is closed by an elastomeric ring 66 that acts as a non-return valve permitting fluid flow only from the shuttle into the gas expansion tube 40.

The tube is filled with a permeable mass or matrix 68 of material acting as a heat source for evaporation and expansion of the carbon dioxide so that it can be injected into the bottle as a pressurised dry gas flow. The material used for this purpose is required to be able to transmit the necessary amount of heat very quickly to the carbon dioxide as it passes through the tube, since the operation of the device with a conventional size of carbon dioxide bulb may occupy no more than two or three seconds. It must also be able to recover heat from the surroundings relatively fast, as the user may want to repeat the operation every two or three minutes. Generally speaking, metallic materials will therefore be preferred for the permeable mass, and the material will in any event preferably be in the form of small particles or filaments providing a multiplicity of small interstitial spaces that form paths through which the fluid flows.

Figure 3:
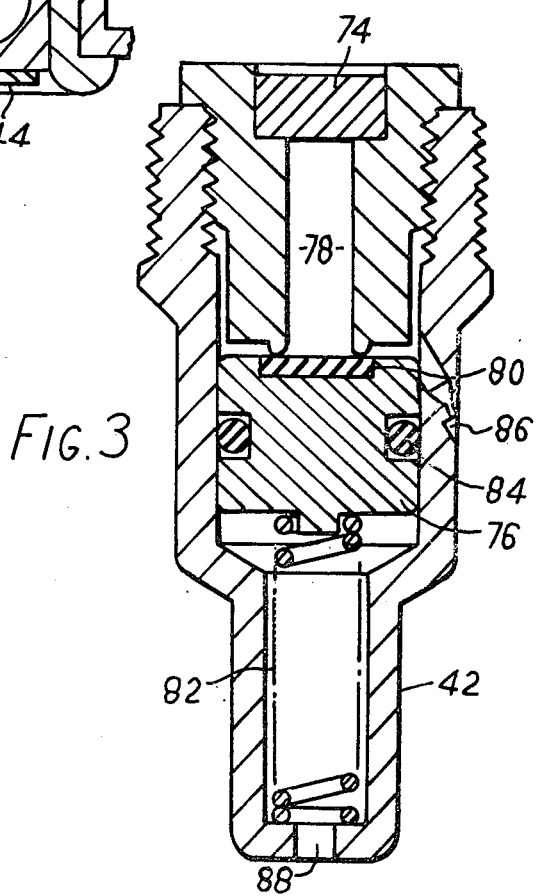
Figure 4:
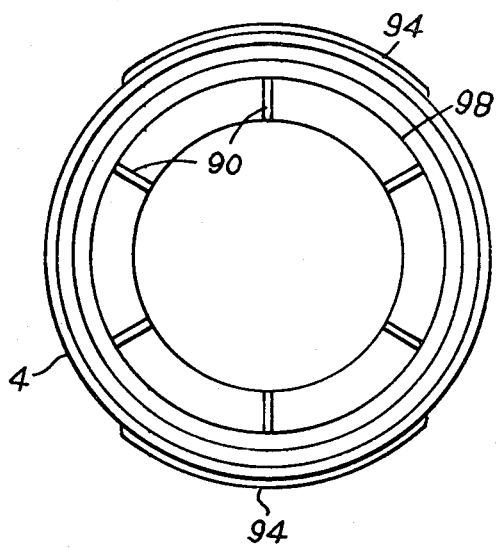
FIG. 4 is a plan view from above of the lower casing part of the apparatus in FIG. 1, FIGS. 5 to 9 are schematic illustrations of a modified form of engagement between the upper and lower parts of the casing of the apparatus, FIG. 5 being a side view of one of the casing parts and FIG. 6 a section on the line VI—IV of FIG. 5, FIG. 7 being a sectional part view of the lower of the two casing parts and FIGS. 8 and 9 being detail sectional views on the lines VIII—VIII and IX—IX in FIG. 7.
Figure 5:
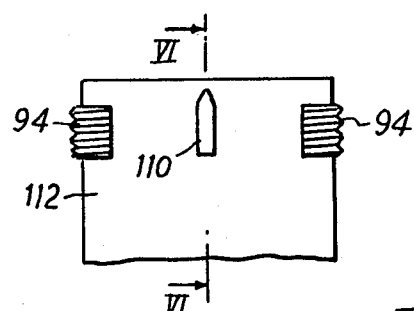
Figure 6:
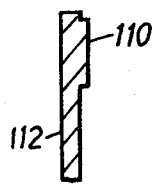
Figure 7:
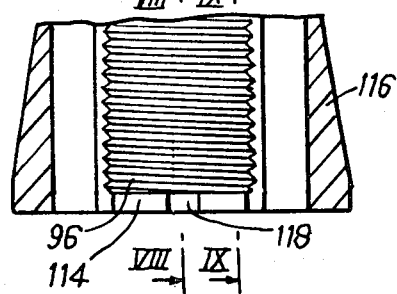
Figure 8:
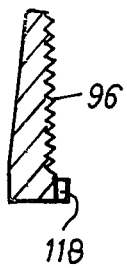
Figure 9:
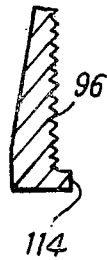

At the exit end of the expansion tube, the outlet orifice valve 42 has the function of preventing flow until a certain minimum gas pressure has been established in the tube as the liquid carbon dioxide from the bulb evaporates. Referring to FIG. 3, the gas from the atomising tube reaches the valve through a porous plug 74 that retains the heat yielding matrix 68 in the tube and the gas pressure acts on a valve body 76 through an entry conduit 78 that is of smaller diameter than the valve body. A sealing disc 80 on the end face of the body confines the pressure to the smaller area of the conduit cross-section as long as the valve body is held against the entry conduit by a compression spring 82. Once the gas pressure overcomes the spring bias it acts on the full cross-sectional area of the valve body and the valve therefore snaps open as a predetermined opening pressure is attained. The flow past the valve body then occurs with a minimal pressure drop.

The rear of the valve body is sealed from the incoming gas pressure by an O-ring 84 and the gas can only escape into the bottle through a nozzle orifice 86. This is of restricted cross-section so that the pressure drop across it is above the critical value and there is a choked sonic flow through the orifice. One effect is that the shearing action of the relatively high speed gas flow emerging into the liquid in the bottle breaks up the flow into very small bubbles that therefore disolve more easily. Initially at least, the restricted orifice also limits the outflow rate of the gas and so maintains a required back-pressure in the atomiser tube 40.

As the gas pressure builds up in the bottle, it will also act on the rear of the valve body by way of the opening 88 in the lower end of the valve. The valve body is therefore sensitive to the pressure drop across the orifice, and the spring 82 is so arranged that it will only allow the valve to be opened when the resultant gas pressure on the full cross-section of the valve body is above the orifice critical pressure.

As the gas pressure in the bottle builds up to its required final value, the rate of solution in the liquid closely approaches the rate of supply of dry gas. Should there be any excess supply of gas, this is able to escape from the top of the bottle because the pressure acting on the shuttle sealing disc 44 at the upper lip of the bottle then causes the shuttle to move against the force of the spring 34, away from the bottle.

The apparatus is adapted to be used with bottles of a range of different heights and diameters, e.g. with capacities of between 750 cc and 1100 cc, with heights of between 250 mm and 320 mm and diameter up to 930 mm. The accommodation of different bottle heights is achieved by the form of screw thread engagement provided between the upper and lower parts of the casing. This comprises groups of teeth forming, on each part, two rack-like screw thread segments 92, 94. The upper part segments 92 are on the skirt 8 and extend over substantially the full height of the skirt, but the lower part segments 92 occupy only the topmost maximum diameter region of the tapered casing lower part 4.

On each casing part, the two segments are diametrically opposed and subtend an angle slightly less than the gap between segments on the other part. It is therefore possible to align the two casing parts so that they can be telescoped axially into each other without engaging their screw thread segments. The teeth of the segments are obliquely inclined to form a screw lead after said telescoping movement; as they are interengaged by relative rotation between the casing parts 4, 6 there will also be a further relative axial displacement between the parts.

In use, therefore, any bottle can be placed in the casing lower part 4 that reaches the top of that casing part or projects somewhat above it, and the upper part 6 is lowered onto the lower part 4 while the two pairs of screw thread segments 92, 94 are kept out of alignment, the gas expansion tube 40 being inserted into the container neck in this movement. The casing upper part will come to rest on the bottle with the sealing disc 44 bearing on the top lip of the bottle, and when the upper part is then rotated, the screw thread segments will engage and the upper part will be forced further downwards, firstly to engage the sealing disc firmly with the bottle lip and secondly to urge the shuttle 30 upwards relative to the bulb holder 16 so that the hollow needle 32 pushes the bulb against the closed lid 20 and is forced into the bulb interior.

It will be noted that the bulb cannot be pierced and the contents expressed until the pivotable lid 20 is properly positioned to resist upwards movement of the bulb, i.e. with the edges 46, 48 abutting, and the bottle lip is tightly engaged with the shuttle bottom sealing disc 44.

As shown in FIG. 1, the smaller groups of teeth forming the segments 94 of the casing lower part are engaged with the topmost portions of the larger groups of teeth forming the segments 92 of the casing upper part, which is then substantially at its lowermost position on the casing lower part. It will be clear that if a taller bottle is used that projects above the top of the casing lower part, the apparatus will act in the same manner but the segments of the casing lower part will engage a lower region of the casing upper part segments, as determined by the position at which the casing upper part comes to rest on the bottle lip at the end of the initial telescoping movement. It is to be understood that it is also possible to reverse the arrangement of segments illustrated, so that the smaller groups of teeth are on the casing upper part and the larger groups on the lower part.

If different size containers are used, they may have different diameters, but they will be centered by a series of symmetrically arranged resiliently flexible ribs 96 at the bottom of the casing lower part interior. These ribs starting from radial positions spaced from the centre of the base, extend upwardly towards their outer ends at the peripheral wall 98 to which they are connected in web-like manner, and will therefore tend to centre the bottle, in particular when a downwards pressure begins to be applied to the bottle by the screw engagement of the casing upper part.

As a further safety feature, should the shuttle 30 not move to vent excess pressure in the bottle as the gas flows into it, a blow-out disc 102 (FIG. 2) of elastomeric material is mounted on the piston 104 of the shuttle. This is positioned behind a small aperture 106 in the sealing disc 44 that is located near the disc inner periphery to ensure it will open into the top of the bottle inwardly of the top lip. Behind the blow-out disc 102 there is a larger aperture 108 in the piston 104 so that the disc is supported only around a peripheral margin. At a predetermined pressure in the bottle, therefore, the flexible blow-out disc will be deformed sufficiently for it to be driven through the aperture 108 and so leave an open passage for relief of the pressure in the bottle.

To assist the initial location of the upper and lower casing parts on each other, and to ensure that the full set of threads of the axially shorter groups of segments will always be engaged when the apparatus is brought into use, it is possible to provide axial guide means between the upper and lower casing parts as exemplified by FIGS. 5 to 9. The guide means comprise a projecting rib 110 on that casing part 112 carrying the smaller screw thread segments 94, and a thickened rim 114 on the other casing part 116 preceding and circumferentially coincident with the larger screw thread segments 92 there, with a recess 118 in that rim for the passage of the rib 110. The part 112 as illustrated corresponds to the casing lower part 4 in FIG. 1, and the part 116 corresponds to the upper part 6.

The rib is disposed between the segments 94 of its casing part. It terminates with a tapered outer end extending to adjacent its casing part rim, axially slightly beyond the segments 94, and its opposite end extends axially to the level of the inner end of those segments. The rib does not project radially beyond the root radius of the teeth of its associated segments. This means that when the two casing parts are being assembled together, and the rib 110 has passed through the recess 118 in the thickened rim 114 of the other casing part it can then move freely over the screw thread segments of that other casing part.

When assembling the casing upper and lower parts together, therefore the user first approximately locates the upper part on the lower part, and as they are brought together the tapered end of the rib 110 will provide the correct orientation between the parts as it engages the recess 118. While the rib is in the recess, relative rotational movement between the two casing parts is prevented, so that the screw thread segments cannot be engaged until the rib has passed completely through the recess, and the smaller groups of threads 94 have similarly passed through the gaps between the arcuate portions of the rim 114. At that stage the complete axial length of the smaller segments will be engageable with the segments of the other casing part. It is therefore ensured that the two casing parts will be securely fastened together with a sufficient number of segment teeth interengaged.

FIG. 10 illustrates a number of different forms of permeable mass or matrix that can be used in the gas expansion tube 40, although not necessarily all in the same tube. The figure shows a spiral of tightly rolled wire gauze 120, a pile of wire gauze discs 121, or a mass of particles 122, or a random, flocculant mass of wire or thin strip 123 in each case tightly fitting within the inside profile of the tube cross-section. Porous retainers 124 are fixed in the tube to hold the permeable mass in place. The tube cross-section may take a variety of forms and FIGS. 10a, 10b and 10c illustrate some examples. The latter two examples can be assembled in honeycomb fashion to form a group of small cross-section flow passages in series and/or parallel connection, with interposed sheet-like electric heating elements if desired.

FIG. 11a shows a modified expansion tube 40a with an inlet 126 to an annular space 127 containing the porous mass 68 into which a tubular enclosure 128 is inserted containing a tubular heating element 129. There is a communicating region below the bottom end of the enclosure 128 between the inner and outer regions of the annular space and at the top of the conduit an end space 130 communicates with a central exit tube 131 to the outlet 132. Transverse porous retainers 124 are provided if the porous mass in loose powder form but may not be necessary if it is in the form of spirally wound wire gauze. The wet fluid entering at 126 is constrained by the enclosure 128 to flow through the porous mass, first downwards through the outer region of the annular space 127 and then upwards through its inner region, before exiting via the tube 131. The tubular electrical element is operated to transfer heat to the porous mass by conduction and may be energised continuously while successive charges of fluid are passed through the apparatus.

FIG. 11b shows another modified expansion tube 40b filled with the porous mass 68, retained if necessary by partition 124, and two metal combs 134 at opposite ends of the conduit which penetrate longitudinally into the porous mass in electrical contact therewith to enable an electric current to be passed directly through the mass, which is of an electrically conductive material and which by virtue of the voids therein has sufficient resistance to generate a heating effect within the mass. In this embodiment the material of the conduit 40b must be of sufficient electrical resistance so as not to short-circuit the current path through the mass. Many suitable materials such as quartz or ceramics are commercially available.

FIG. 11c shows an arrangement in which an electric inductance winding 136 surrounds the tube 40c. In this embodiment the material of the tube or conduit is chosen so as not to screen the porous mass and inhibit the induction of eddy currents within the mass. To enhance the intensity of the eddy currents the porous mass is preferably sintered as described above.

Figure 12A:
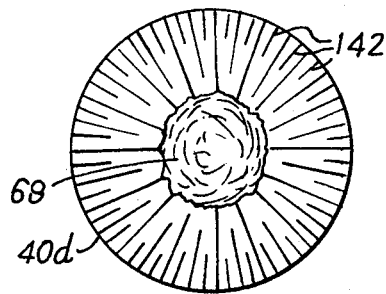
FIG. 12a is a cross-sectional view illustrating a form of conduit with extended internal surfaces.

FIG. 12a shows an example of the construction of an expansion tube or conduit 40d with a multiplicity of longitudinal inwardly projecting radial ribs 142 to form the extended internal surface area. These ribs may extend to the centre of the conduit or there may be a significant central core space filled with porous mass 68, in this instance in wire form in any of the configurations already described. Instead of ribs, an analogous extension of the conduit internal surfaces may be obtained if the conduit wall has a lobed configuration: this also results in an extended external surface area.

Figure 12B:
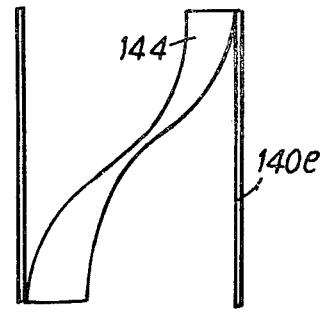
FIGS. 12b and 12c are a detail axial section and cross-section respectively illustrating ann alternative form of conduit.
Figure 12C:
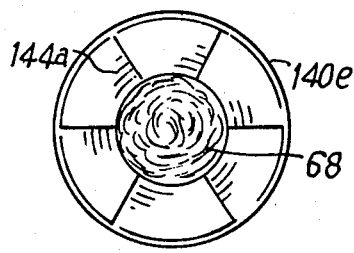

FIG. 12b shows an alternative construction of an expansion tube or conduit 40e with an internal helical fin 144 to increase the contact area for the porous mass. For clarity only one helix is shown here and that for only one half pitch of length, but of course multiple fins can be provided at a desired pitch. Thus, FIG. 12c shows the finning as a six-start helix 144a. This latter figure also illustrates the packing of the interior of the tube with the porous mass, which fills the tube to its cylindrical wall although the fins are shown uncovered for clarity.

Figure 13B:
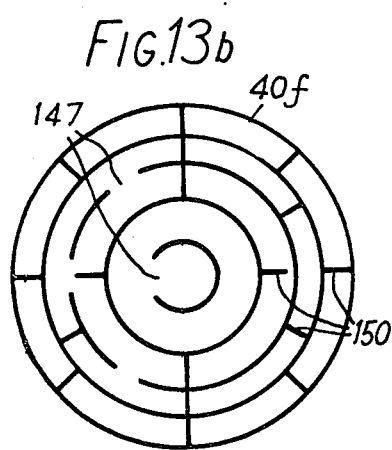

In the example illustrated in FIG. 13a there is a tube or conduit 40f with a series of concentric tubes 146 in it, each with perforations 147 around its walls adjacent opposite ends. At one end the annular spaces between alternate pairs of the tubes have porous end rings 148 to contain the porous mass 68 that may fill all the annular spaces if extra heat exchange capacity is required. An end plate 149 closes the annular spaces off remote from the tube inlet end, so that in alternate annular spaces the fluid is constrained to flow downwards and in the intervening spaces it is constrained to flow upwards. As FIG. 13b shows, the concentric tubes may be provided with ribs 150 the main purpose of which is to enhance the transmission of recuperative heat from the surroundings.

Figure 14A:
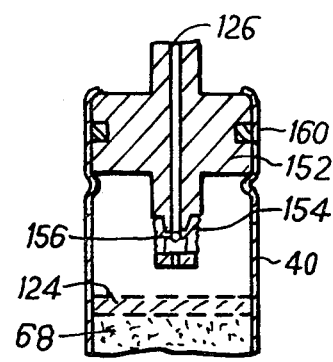
FIGS. 14a and 14b are cross-sectional views showing a non-return valve at the inlet and outlet respectively of a heat exchange conduit.
Figure 14B:
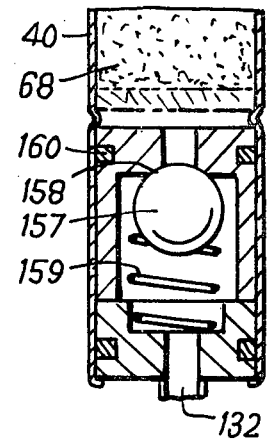

FIGS. 14a and 14b show examples of non-return valves 152 and 153 which may be incorporated respectively at the inlet 126 and at the outlet 132 of the conduit. The inlet valve comprises an elastomeric sleeve 154 in tension in an annular recess to cover a transverse hole 156 communicating with the inlet 126, as in a so-called Woods valve commonly used in pedal cycles, and is arranged to open at a very low superpressure on its inlet side. The outlet valve comprises a ball 157 urged onto a conical setting face 158 by a spring 159. Both valves are separated from the porous mass 68 by the partitions 124 and both are shown with O-rings 160 to prevent leakage of the fluid.

FIG. 15 illustrates a modified form of outlet orifice valve 172, in which parts already described with reference to the orifice valve 42 in FIG. 1 are indicated by the same reference numbers. In this modified construction, a valve body 174 is moulded integrally with a diaphragm 176 from a rubbery material. The diaphragm outer edge engages in a recess 178 in the inner wall of the valve housing, beyond the nozzle orifice 86, and the resilience of the diaphragm provides the biasing force that holds the valve body on its seating. In other respects, the valve operates in the same manner as the first-described example.

Further possible modifications of the apparatus already described are illustrated in FIG. 16. Although not shown, this apparatus also has upper and lower casing parts engageable by screw thread segments in the manner described above, with the container for the liquid to be gasified being inserted in the lower casing part (not shown) and a conventional 8 gm liquified carbon dioxide bulb B inserted in a bulb holder 200 in the upper casing part. However, the figure shows only the top wall 202 of the lower skirt of the upper casing part, on which lower skirt the segments of the upper casing part are formed.

As has already been described, a hollow needle 204 is mounted in a shuttle 206 slidable in the bulb holder and urged downwards by a spring 208. On the underface of the shuttle is resilient sealing disc 212 for engagement with the mouth of the container in the lower casing part, and engagement of the screw thread portions of the upper and lower casing parts is arranged to urge the container mouth into firm sealing engagement with the disc and to force the needle to pierce the bulb so that gas under pressure can flow through the gas expansion tube into the liquid in the container.

In contrast to the first-described construction, however the shuttle now comprises, immediately below the needle, an enlarged cylindrical portion or barrel 214 that is slidable into a bore 216 of a spool, two different forms of which are illustrated in the two halves of FIG. 16 and indicated by reference 218a and 218b. In both examples the spool has an integral collar 210 below the barrel. The spring 208 acts on the spool so that the shuttle and spool are urged apart, but the collar 210 limits this relative movement when it engages the underside of the barrel. The movement of the spool is limited by a retaining clip 220 that projects through the wall of the bulb holder into a cylindrical recess 222 in the spool, and FIG. 16 shows the spool and shuttle in their lowermost positions.

In the example in the right-hand half of FIG. 16 there is an upper O-ring 224 mounted in the spool bore, to seal with the neck of the bulb B that has been inserted to rest upon a locating ring 225, and a lower O-ring 226 is mounted on the barrel 214 to form a seal between the barrel and the spool 218a when the shuttle is urged towards the bulb. A small hole 227 provides a vent for excess pressure from the spool interior between the O-rings when the barrel withdraws to a lowermost position relative to the spool, at the end of a charging operation.

In the example in the left-hand of FIG. 16, the bulb is engaged by a sealing sleeve 228 which both seals against the neck of the capsule and limits its movement downwards into the bulb holder. The sealing sleeve is inserted into the spool 218b before a retaining ring 230 is applied to secure the sleeve in place. As in the right-hand example, a lower O-ring 216 is mounted on the barrel 214 to form a seal between the barrel and the spool bore when the shuttle is urged towards the bulb. A vent hole is not required in this instance because gas can escape past the seal 228 when the axial sealing loading is relieved as the barrel is withdrawn.

By making the effective seal diameter between the bulb and the seal, as provided by the O-ring 224 or the sealing sleeve 228, either smaller than or equal to the effective seal diameter between the spool and the needle barrel, an increase of pressure in the space between the two seals will not produce a resultant force tending to force the spool downwards away from the bulb.

However, because the pressure load developed on the barrel is transmitted to the shuttle seal and increases the force with which the seal is applied to the container mouth, the barrel has a maximum permissible diameter.

Otherwise, the increase of the container relief pressure, i.e. the pressure at which the shuttle is lifted to vent the container interior, would become excessively high as the pressure in the spool bore increases. Therefore, the measures taken to ensure that the neck of the bulb remains sealed in the spool must also be effective with the diameter of the barrel limited to the extent necessary to ensure the container pressure will be relieved in safety.

In the result, it has been found possible to prevent separation of the bulb and the spool while at the same time restricting the load on the shuttle seal by limiting the barrel diameter if at the overpressure conditions to be expected in the spool bore, a limited resultant downwards pressure force is allowed to develop on the spool that is always less than the upwards force of the spring 208.

Both embodiments illustrated in FIG. 16 operate in a similar manner. Before the two casing parts are put together the liquified gas bulb is inserted in the bulb holder 200 in the upper casing part and a liquid-filled container is inserted into the lower casing part. The spool 218a or 218b is in its lowermost position, with the upper shoulder of the cylindrical recess resting on the retaining clip 220, and shuttle 206 is also in its lowermost position, depending from the spool collar 210. The upper casing part has a pivoting lid of the form described above, mounted on the stub pivots 232 and this is closed once the bulb is inserted.

When the upper casing part is brought down onto the lower part the container mouth engages the sealing disc to seal against it and in so doing urges the shuttle upwards. Under its own weight the casing upper part will move downwards while the bulb and spool remain in the same positions relative to each other and the container, until the closed top lid comes into contact with the top of the bulb. In this position the axial telescoping movement between the upper and lower casing parts is completed, and the casing top part is supported through the spring 208, with the needle still spaced from the bulb. If the screw thread portions of the two parts are now engaged the bulb is brought down onto the needle and the needle is forced into the bulb to release its contents through the gas expansion tube into the liquid in the container.

Because the needle does not begin to pierce the bulb until the screw thread portions are partly engaged, it is possible to ensure that the two parts are securely interconnected before the apparatus begins to be pressurised. For example, if the screw thread portions are 90° segments it may be arranged that about one third of the full angular engagement of the thread portions is completed before the needle begins to pierce the bulb.

It will be clear from the foregoing description that because of the relative movement that takes place between the bulb and the pivoting lid it is possible to employ bulbs of a range of different lengths. The maximum length is determined by the ability to close the pivoting lid when the bulb is first inserted and the minimum length is determined by the permitted travel of the spool to reduce the distance between the pivoting lid and the bulb locating ring or sealing sleeve. For practical purposes in an apparatus intended for 8 gm carbon dioxide bulbs a spool movement of some 6 mm may be sufficient. This is in addition to the ability to accommodate containers varying in height over a range of some 10 cm.

Until the pivoting lid has been closed, the screw thread portions between the casing part cannot apply the force required to pierce the bulb. Moreover, the lid cannot be closed after the upper casing part has been lowered onto the lower casing part because with the lid open at that stage the bulb will have been pushed to a position in which it blocks closure of the lid.

The risks of accidents from such misuse of the apparatus are thus avoided.

Referring now to FIGS. 17 to 19, a preferred form of pressure relief means for apparatus otherwise of the form already described comprises sealing means having a planar annular sealing member 302 of silicone rubber or food quality natural rubber mounted on a rigid backing member 304 that forms a cast or moulded shuttle providing gas throughflow means. Other features of the apparatus are not shown, but as in the previously described embodiments it comprises a casing in which the shuttle is axially slidable in the directions X,Y and is urged in the direction Y by a spring against the open lip of the bottle which is mounted substantially coaxially with the shuttle in the casing, the lip thereby being held in sealing engagement with the end face 302a of the flexible sealing member. In FIG. 17 a screw-threaded section 305 is shown to which the gas expansion tube 40 is secured, and the apparatus also comprises unillustrated means by which, as the sealing engagement is made, a carbon dioxide bulb or capsule is pierced and its contents flow through the central axial passage 306 in the shuttle member to an outlet nozzle 308 where there is a nonreturn valve 310 and to the bottle, which has previously been filled with water. As in the first-described embodiment, the non-return valve leads to a heat transfer conduit (not shown) where the bulb fluid is expanded to a dry gas as it flows into the bottle.

The supporting surface 314 of the shuttle providing the backing member for the sealing member and through which the sealing pressure between the flexible member and the bottle lip is transmitted, has two opposite radially elongate recesses or slots 316. At these two positions, therefore, the flexible member is unsupported and can move away from the bottle lip. During the gascharging process, the bottle internal pressure can rise considerably before the gas dissolves in the liquid, and the sealing member will flex at the unsupported portions when the bottle internal pressure passes above some predetermined value, since the slots are themselves open to ambient air pressure. Gas will then be vented from the bottle until the pressure has dropped sufficiently to allow the flexible member to return into full sealing engagement with the bottle lip. By suitable choice of the dimensions and material of the flexible member, and of the dimensions of the slots, the flexural compliance of the unsupported portions in front of the slots 16 can be controlled to set the required safety blow-off pressure.

The gas escapes into free space as soon as it passes the bottle lip, and the seal agaiant the lip is made afresh in each charging operation, of course. There is therefore no risk that an accumulation of foreign matter from previous use will prevent operation of the pressure relief. If the material of the flexible member should be damaged or deteriorate with the passage of time, this will simply result in the unsupported regions flexing at a lower pressure, so that the arrangement has a fail-safe characteristic in this respect.

It will also be seen that the blow-off pressure is independent of the force with which the sealing means is held against the bottle lip, since the sealing member is still held in the same position against the bottle lip while its unsupported portions are flexed by the gas pressure. No complex and sensitive mechanism is required, therefore, and during normal operation it is always possible to provide a secure seal for the charging process.

FIGS. 20 and 21 show an alternative flexible sealing member 322 that can be employed with a backing member 324 having a planar supporting surface 326, in an arrangement otherwise similar to that in FIGS. 17 to 19. Through the backing member and the flexible member there is a central axial passage 328 for the injection of gas into the bottle through a non-return valve and a heat exchange conduit as already described, this not being illustrated in any detail. A planar face 330 of the flexible member faces the sealing face of the bottle lip, but at its rear face the member has four equispaced radial recesses 332 which result in there being corresponding thin-walled unsupported portions 334 at the front face. As in the first-described example, the unsupported portions are flexurally compliant and can be proportioned so as to allow gas to escape once a certain pressure has been exceeded.

FIG. 21 also illustrates how, even with the bottle lip L eccentric to the sealing means, the pressure relief function of the sealing means is equally effective. It will be apparent from this that the flexural compliance of the reduced thickness portions to the bottle internal gas pressure is dependent on the circumferential extent of those portions but not on the radial position of contact of the bottle lip. It will be understood that a similar effect can be obtained using a single radial recess or slot, although it is preferred to provide two or more angularly spaced recesses or slots as this caters for a greater range of eccentricity within given overall dimensions.

In FIGS. 22 and 23 an embodiment of the invention is illustrated similar to the preceding example but in which a planar flexible member 342 is supported by a backing face 344 on a shuttle 346 in which the radial recesses or slots are replaced by an equispaced series of shorter recesses or slots 348 arranged on a pitch circle concentric with the shuttle axis and corresponding to the bottle lip diameter. The areas of the flexible member overlying these slots thus form portions of greater flexural compliance than the remainder of the member. If the bottle lip is located eccentrically on the flexible member, at the opposite diametrical regions of maximum eccentricity the slots will be entirely outside or inside the area encircled by the bottle lip and so not be operative for the relief of the internal bottle pressure, but there is a sufficient number of slots to ensure that one or more of them will substantially coincide radially with the bottle lip L, whatever its eccentricity, and so provide the pressure relief function. Therefore, it is also possible in this case to cope with a considerable radial offset of the bottle relative to the shuttle. In other respects, this embodiment can operate in the manner already described.

We claim:

1. Apparatus for gasifying a liquid with a discrete quantity of a fluid that is supplied in liquified form, comprising means for retaining a first container of said liquified fluid and a second container of the liquid to be gasified, a discharge conduit for the passage of the fluid into said second container, means for sealing said container while said conduit is in communication therewith, means for connecting said conduit to said first container for the release of the liquified fluid therefrom, at least one flow path of extended surface area being provided within said conduit for said fluid, said at least one flow path being formed in a material providing a heat source for said fluid, whereby the fluid is caused to flow in intimate contact with said material for heat exchange therewith to absorb from said material the heat required to convert the fluid to a dry gaseous state.

2. Apparatus according to claim 1 wherein said at least one flow path of extended surface area comprises a multiplicity of small cross-section flow paths within said conduit.

3. Apparatus according to claim 2 wherein dividing walls within said conduit divide the internal cross-section of the conduit into a series of smaller cross-section passages that are interconnected in a manner selected from the group of parallel connection, series connection and mixed parallel/series connection, to provide said multiplicity of small cross-section paths.

4. Apparatus according to claim 3 wherein the conduit comprises a plurality of co-axial tubes defining coaxial flow passages and communication means at opposite ends of said passages direct the fluid flow in series through said flow passages.

5. Apparatus according to claim 2 wherein the conduit comprises at least one passage having a permeable mass occupying its cross-section, said mass providing said multiplicity of small cross-section paths.

6. Apparatus according to claim 5 in which the permeable mass in sintered.

7. Apparatus according to claim 5 in which the permeable mass is retained in position by means of one or more permeable partitions fixed transversely across the conduit.

8. Apparatus according to claim 1 in which the conduit is internally formed with at least one inwardly directed partition.

9. Apparatus according to claim 1 in which electrical heating means are provided for recuperation of heat by said heat source material.

10. Apparatus according to any claim 1 wherein a non-return valve is disposed at least at an outlet end of the conduit.

11. Apparatus according to claim 1 wherein at least one outlet orifice is provided for the dry gas exiting from said conduit, said orifice having a restricted cross-section limiting the rate of discharge of said gas into the liquid.

12. Apparatus according to claim 11 comprising a valve device in said conduit for controlling the flow of gas under pressure in the conduit, said valve device comprising a closure body displaceable within a flow chamber, peripheral sealing means between said body and the chamber, resilient biasing means urging the closure body against a gas inlet port to said chamber against the gas pressure upstream of said inlet port, said inlet port having a cross-section less than the cross-section of the chamber at said peripheral sealing means whereby after displacement of the valve body by the gas pressure acting against the resilient bias an increased pressure force is applied to the body to maintain the inlet port open, said outlet orifice being arranged to be placed in communication with said inlet port by said displacement of the body for the discharge of the gas into the liquid.

13. Apparatus according to claim 12 wherein an opening is provided in said chamber for transmitting to the closure body the prevalent pressure of the liquid, said pressure acting to urge the body towards said inlet port whereby the movement of the closure body is responsive to the pressure differential between the gas at the inlet port and the liquid being charged with gas.

14. Apparatus for gasifying a liquid with a discrete quantity of a fluid that is supplied in liquified form, comprising means for retaining a first container of the liquified fluid and a second container of the liquid to be gasified, a discharge conduit for the passage of said fluid to said second container having an outlet extending from said first container retaining means to project through an opening of said second container into the liquid therein, means for sealing said opening of the second container while said conduit outlet extends into the liquid in said container, at least one flow path of extended surface area being provided within said conduit for said fluid, said at least one flow path being formed in a material providing a heat source for said fluid, whereby the fluid is caused to flow in intimate contact with said material for heat exchange therewith to absorb from said material the heat required to convert the fluid to a dry gaseous state, and flow restriction means being provided in said outlet to control the outlet flow of dry gas into the liquid in the second container.

15. Apparatus for discharging a fluid from a sealed bulb into a liquid in a container, comprising:
mounting means arranged to permit relative movement of the bulb towards the container,
an opening device disposed between the bulb and the container for opening the bulb during said relative movement to permit the fluid to flow into the container to gasify the liquid in the container,
said opening device being provided with sealing means for engaging an entry opening of the container through which said gas is admitted,
biasing means for holding said sealing means in engagement with said opening,
said biasing means comprising resilient means acting upon the opening device to urge it away from the bulb, whereby the bulb is opened by movement counter to the direction of action of said resilient means,
the fluid pressure in the container acting upon the sealing means against said biasing means whereby the sealing means are displaceable away from said opening by an increase of the container pressure over a limiting value to vent excess pressure fluid from the container.

16. Apparatus for discharging fluid from a sealed bulb into a liquid in a container, comprising mounting means arranged to permit relative movement of the bulb towards a top opening in the container, an opening device disposed between the capsule and the container comprising means for opening the bulb during said relative movement to permit the fluid to flow into the container to gasify the liquid in the container, the mounting means comprising relatively displaceable parts for receiving the container and the bulb, co-operating toothed elements on the respective parts of the mounting means occupying spaced peripheral portions on each said part, spaces between said peripheral portions of each part at least equal in peripheral extent to their co-operating peripheral portions whereby the two parts can be telescoped axially together with the toothed portions on each aligned with said spaces on the other, said toothed portions being thereby engageable selectively at different relative axial positions of the parts so that said engagement is effected with the bulb-receiving part in a predetermined position relative to the top openings of containers of different heights.

17. Apparatus according to claim 16 wherein the mounting means part receiving the bulb comprises a bulb support, guidance means in which said support is slidable in the direction of telescoping movement of said mounting parts, and an end stop for limiting the movement of said support when the parts are telescoped together, whereby said engagement of the co-operating parts of the mounting means is effected at relative axial positions of said parts dependent on the axial length of a bulb inserted in the apparatus.

18. Apparatus according to claim 16 wherein the toothed portions of the relatively displaceable parts have different extents in the direction of axial telescoping of the parts, and guide means are provided comprising respective guide elements on the two parts that are engaged in the initial telescoping of the parts to limit relative rotational movement therebetween until at least a major part of the extent of the shorter tooth portion of one of the parts is axially coincident with the longer tooth portions on the other of the parts.

19. Apparatus according to claim 16 wherein said toothed portions comprise screw-thread segments of the respective parts of the mounting means, whereby engagement of the toothed portions by relative rotation of the parts also causes relative axial displacement of said parts for opening the bulb.

20. Apparatus according to claim 16 wherein said mounting means part for receiving the bulb comprises a holder for the bulb and retaining means to support the bulb in said holder against the reaction of the gas pressure during said charging, a pivot attachment for said retaining means on said mounting means for pivotal displacement of the retaining means relative to the holder to and from a non-operative position in which it allows access to the holder for insertion of a bulb therein, stop means determining a limiting operative position for the retaining means after the insertion of the bulb, the pivot attachment of the retaining means being offset from the line of action of the gas pressure whereby said pressure acts to urge the inserted bulb against the retaining means to hold said means in said limiting operative position.

21. Apparatus for discharging gas under pressure into a liquid in a container and comprising a gas through-flow means disposed centrally with respect to annular sealing means for engagement with an opening of the container opening to be circumferentially surrounded thereby, said sealing means comprising a flexible sealing member for sealing contact with the container opening and means for supporting the sealing member against said opening, the sealing means having a flexural compliance to internal pressure in the container that is non-uniform with respect to its circumferential extent around the gas injection means, at least one angular portion of the circumferential extent of the flexural sealing member being thereby provided with a lesser resistance to flexure whereby said at least one portion is deformable to release excess gas pressure in the container while said sealing member is retained against the container opening elsewhere around said circumferential extent of the sealing means.

22. Apparatus according to claim 21 wherein the sealing means is provided with a plurality of portions of greater compliance circumferentially spaced about the gas throughflow means.

23. Apparatus according to claim 21 wherein the sealing means is provided with at least two radially elongate portions of greater compliance disposed substantially symmetrically relative to the gas throughflow means.

* * * * *